Dec. 30, 1930.                F. RAY                    1,786,506
                          EXPANSION JOINT
                        Filed Dec. 31, 1923
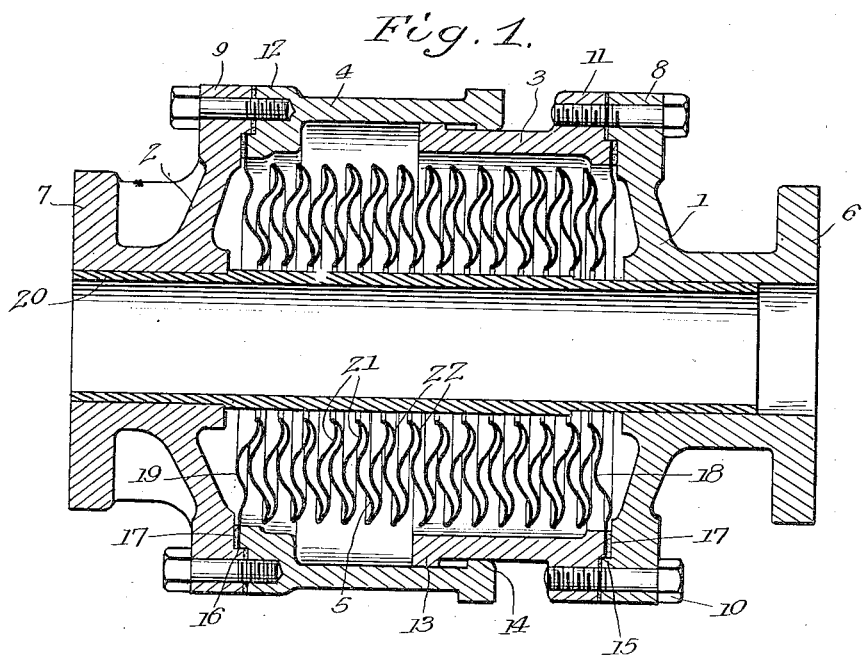
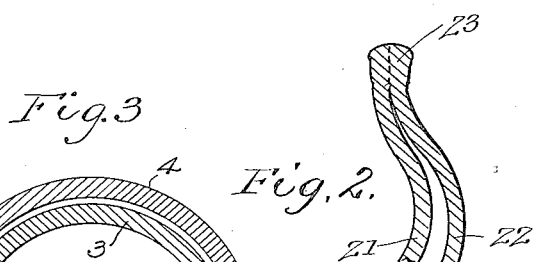
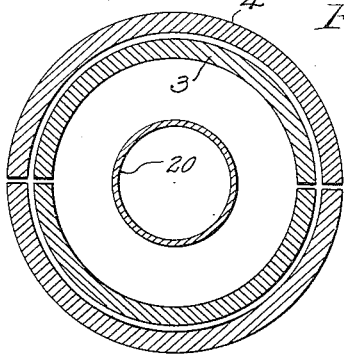
Frederick Ray, INVENTOR.
BY
Rogers, Kennedy & Campbell
ATTORNEYS.

Patented Dec. 30, 1930

1,786,506

UNITED STATES PATENT OFFICE

FREDERICK RAY, OF SHORT HILLS, NEW JERSEY

EXPANSION JOINT

Application filed December 31, 1923. Serial No. 683,789.

My present invention relates particularly to expansion joints for pipe-lines which are subject to expansion and contraction, wherein the expansible member consists of a series of elastic disks welded or otherwise secured together at their inner and outer peripheries, such as shown in my previous Patent No. 1,213,906, granted January 30, 1917.

In the structure of the patent, the elastic element is welded at each end to certain tubes so as to enable it to be attached to the pipeline. I have found, however, that it is very desirable to have the elastic element free from all permanent connection to other parts of the joint so that it can be more readily welded and heat-treated and, also, so that it may be replaced in case of leakage or breakage. In the construction disclosed in my said patent, the disks are so formed that, when welded together, each disk is joined to the next in a continuous curved section of approximately uniform thickness so that the elasticity and other physical properties of the metal in the weld would be substantially the same as in the metal of the disks themselves. I have found, however, that in producing the weld (in the manner revealed in my said patent) by the use of an electric arc, the tendency of the arc is to burn through the metal; hence, the thickness of the disks, to enable them to withstand the pressure imposed on them, must be such as to make it difficult to form them with the requisite curve at their junctures.

My present invention aims to obviate all these difficulties and to provide an expansion-joint with a suitable casing and flanges for attachment in the pipe-line and wherein is provided a removable, elastic expansible member which can be readily constructed of disks of elastic metal—such an alloy steel— the shape of the disks being such that they can be readily formed in dies, either by hot or cold pressing, and at the same time form suitable contacts with each other so that they may be welded together by means of the electric-arc process, or by other suitable processes, without danger of burning through or cutting into the metal of the disks at the sides of the welds.

I have discovered that it is not necessary to join the disks together in continuous curved sections of approximately uniform thickness in order that the bending stresses set up by the expansion or contraction of the elastic element be properly distributed throughout the disks without undue concentration at any point, but that equally good results are obtained by joining the disks together with welds having a thickness much greater than the thickness of the disks so that the welds themselves are substantially rigid as compared to the disks, this causing, as a result, the elastic bending or flexure to occur within the disks themselves. Provided that no undue concentration of stress is set up by making the welds rigid—and such I have found to be the case—it is of great advantage to make the welds of greater thickness and strength than the disks, thereby providing an increased factor of safety at the point where most needed in view of the general difficulty of controlling welding processes.

In the construction of the elastic element, it is essential in order to obtain the maximum possible elastic movement to use a metal for the disks having a high elastic limit. I have found various alloy-steels to have the requisite physical properties; and, in particular, steel containing about three and one-half per cent (3½%) nickel and thirty-five hundredths per cent (0.35%) carbon is especially suitable, inasmuch as it is possible, by suitable heat treatment, to obtain an elastic limit of about 170,000 pounds per square inch without too great brittleness while, at the same time, disks of this material can be pressed into the desired shape and can be satisfactorily welded. While it is advantageous (as set forth above) to have the welds thicker than the disks, I have found that the total strength and elastic limit of the weld is not increased by increasing the thickness of the weld, since there is always a section in the welded or melted material adjoining the unmelted material of the disk of a thickness no greater than the thickness of the disk. As a result, in order to make the total strength and elastic limit of the welds equal to the total strength and elastic limit of the disks, it is necessary to make the unit strength and elastic limit of the welded or melted material equal to the unit strength and elastic limit of the disks.

In the process of electric-arc welding, as commonly practiced, the metal from the electrode is deposited so as to fill the space between the two pieces of metal to be welded together so that this deposited metal welds on to the surface of each of the pieces of metal and, thus, holds the two pieces of metal together in exactly the same way as solder holds two pieces of metal together. This method of welding results in the load upon the weld being carried by the deposited metal. As far as I am aware the greatest strength that has been obtained with such deposited metal is from 80,000 to 85,000 pounds per square inch, even in the case of nickel steel. A weld of such strength would be entirely unsuitable for joining the disks of my expansion-joint, as the welds would fail long before the full elasticity of the plates could be made use of and, as a result, there would be no advantage in using disks of a high elastic limit.

I have discovered that, by bringing the plates to be welded close together and using a welding-rod of large diameter relatively the thickness of the plate, it is possible to melt the plates themselves together while depositing a comparatively small amount of metal from the welding-rod, which deposited metal in my opinion remains more or less separate and distinct from the melted metal of the plates or, at the most, only partially mixes with this melted metal and results in a weld of great strength. By using this process of welding, I have been able to make welds in nickel-steel plates having an elastic limit in the weld itself of approximately 170,000 pounds per square inch after suitable heat-treatment and, thus substantially the same as the plate itself. As a result, it appears that while the metal is injured in passing through the arc, it is not injured in being simply heated to the melting point by the arc for the short period of time elapsing while the weld is made. While this method of welding is particularly useful in connection with my expansion joint, it is obvious that it could be used for many other purposes where a weld of high strength is desired.

Other features of the invention and details of construction will be hereinafter more fully pointed out in connection with the accompanying drawings, in which I have shown a preferred embodiment of the invention, and will be made more fully apparent in connection with the appended claims.

Referring now to these drawings;

Figure 1 is a cross-sectional view of my improved expansive joint; and

Fig. 2 is a fragmentary sectional view of a portion of the elastic element showing, on an enlarged scale, a section through a weld.

Fig. 3 is a cross-section through the joint, with the expansion member thereof omitted.

As already implied, my invention is broadly novel in many respects and, accordingly, it will be understood that the embodiment herein shown for purposes of description and illustration is merely a preferred construction and that the invention is capable of a wide range of mechanical embodiments within the spirit and scope of the invention. But, for the purpose of making the invention clearly understood, I will describe it especially with reference to a construction which is well adapted to steam-pipes.

Accordingly, referring to the drawings, it will be seen that I have provided a casing consisting of flanged end-pieces 1 and 2, and intermediate rings 3 and 4, preferably made of cast iron or steel castings, shaped so as to support and entirely surround an elastic element 5. The end-pieces 1 and 2 are formed with flanges 6 and 7 provided with suitable bolt-holes (not shown) for attaching to corresponding flanges of the pipe-line, and with flanges 8 and 9 for attachment to the intermediate rings 3 and 4 by means of suitable bolts 10 shown as screwed into flanges 11 and 12 of said rings 3 and 4. The ring 3 is provided with a flange 13 extending outwardly, and the ring 4 with a flange 14 extending inwardly, the flanges 13 and 14 providing a positive stop to the extension of the joint when they contact. Likewise, a positive inward stop is provided by the contact of the flange 14 with the flange 11. The rings 3 and 4 are made in halves as shown in Fig. 3; that is, they are divided on a plane passing through the longitudinal axis of the joint, so that they may be assembled as shown; the male and female joints 15 and 16 (in connection with the bolts 10) holding the halves together substantially the same as if they were cast together. The male and female joints 15 and 16 are of such diameter and depth as to contain, within the female portion, gaskets 17 and enlarged-end disks 18 and 19 of the elastic element 5, thus forming aligning supports for the elastic element, and steam-tight joints between the end-pieces 1 and 2 and the elastic element 5.

A tube or pipe 20 is fitted tightly within the end-piece 2 and extends through the joint inside of the elastic element 5, and makes a sliding fit within the end-piece 1 for the purpose of maintaining the end-pieces 1 and 2 always in alignment as they move relatively to each other due to the expansion and contraction of the pipe-line. This tube also prevents the escape of any considerable amount of steam in case of rupture of the elastic element, as only the leakage between the tube 20 and the end-piece 1 can escape under such circumstances.

The elastic element 5 consists of two sets of disks 21 and 22 of different contour and alternately arranged with an end-disk 19—of the same shape as the disk 21 except that it is provided with a flat annular flange about its exterior—and an end disk 18 of the same shape as the disk 22 and provided with a similar flange about its exterior.

As is shown, the shapes of the disks are such that all disks of the form of those marked 21 contact on their left at their outer peripheries with the outer peripheries of the disks of the form marked 22 and, on their right, at their inner edges with the inner edges of the disks of the form of disks 22 with the exception of the end-disks which contact only at their inner edges. The shape of the disks is such that they contact with each other—the back face of one with the front face of the other—both at their inner and outer edges for a distance of about three-sixteenths ($\frac{3}{16}$) of an inch and then gradually diverge, as clearly shown in Fig. 2, the dotted line therein 23 representing the line of contact before the weld is made.

In constructing the elastic element, a pair of disks, such as 21 and 22, are clamped together so that their inner edges are in tight contact and perfect alignment and mounted upon a suitable rotatable face-plate. The plates are then welded together by means of an electric arc set up between the plates and a suitable welding rod or electrode, the arc playing directly upon the two edges of the plates and melting them together in a solid mass, as shown in Fig. 2. After the disks are welded together in pairs at their inner edges, they are mounted together and welded at their outer edges, thus completing the welding of the elastic element. As already stated, I prefer to make the disks of three and a half per cent (3½%) nickel steel containing about thirty-five hundredths (0.35) per cent carbon and six-tenths per cent (0.6%) manganese. When made of this material, I treat the whole elastic element in a furnace to a uniform temperature of about 800° C., and then plunge it into oil, after which I reheat it to a uniform temperature of about 400° C., and let it cool slowly. Such an elastic element will show an elastic limit of about 170,000 lbs. per square inch throughout the metal of the disks and the welds and, in addition, will exhibit great toughness. It will be capable of withstanding a large number of movements within the elastic limit and high internal pressure and temperature. The particular diameter, thickness and number of disks depend upon the size of pipe, pressure within the pipe, and the amount of expansion and contraction to be taken care of, and these can be determined for any particular case by those skilled in such matters.

The joint as shown in Fig. 1 is in substantially neutral position; that is, it is capable of both extension and contraction from the position shown. When used in a steamline, it would be expanded, by any suitable method, before installation—so as to permit increased movement, as disclosed completely in my aforementioned patent; and, since this particular feature forms no part of the present invention, it need not be described further in this application.

As already pointed out, my invention is capable of a wide variety of mechanical embodiments and changes in arrangement, proportion and combination of parts without departing from the spirit and scope of my invention as defined in the appended claims.

Having described my invention, what I claim as new and desire to secure by Letters Patent is:

1. In an expansion joint, the combination of means for attaching the joint to a pipe line, said means comprising two relatively movable parts, an expansion member, and means for fastening the expansion member removably to said parts, said means including two members movable to and from each other in overlapping relations and formed at their inner ends with opposed stop lugs adapted to engage each other and limit the relative outward movement of the members, said members being detachably fastened to said relatively movable parts with the outer ends of the expansion member clamped therebetween.

2. In an expansion joint, the combination of means for attaching the joint to a pipe line, said means comprising two relatively movable parts formed each with an outwardly extending flange, an expansion member disposed between said parts and formed at its ends with outwardly extending flanges adapted to seat against the first mentioned flanges, a member intermediate the flanges on the relatively movable parts and formed with flanges adapted to seat against the flanges on the expansion member, and means for detachably clamping the flanges of the expansion member between the flanges on the relatively movable parts and the flanges on the intermediate member.

3. In an expansion joint, the combination of means for attaching the joint to a pipe line, said means comprising two relatively movable parts formed each with an outwardly extending flange, an annular expansion member disposed between said parts and formed at its ends with annular flanges extending outwardly beyond the external surface of the expansion member, an annular fastening member surrounding the expansion member and formed at its ends with flanges adapted to seat against the flanges of the expansion member, and means for detachably fastening the flanges of the annular fastening member to the flanges on the said relatively movable parts to clamp the flanges of the expansion member between them.

4. An expansion member for expansion joints, said member being composed of a series of hardened steel disks welded together at their inner and outer peripheries to form a unitary homogeneous structure depending in its expansion and contraction upon the elastic property of the various disks, the two end disks of said expansion member being free at one of their outer edges and presenting attaching flanges adapted to be fastened to the pipe connecting members of the expansion joint; whereby the concentration of stress occurring in the zone between the elastic and rigid portions of the joints is transferred from the region of the inner circumference of the end disks, where it would be a maximum, to the region of the outer circumference of the end disks where it is a minimum.

5. An expansion member for expansion joints, said member being composed of a series of hardened steel disks welded together at their inner and outer peripheries to form a unitary homogeneous structure depending in its expansion and contraction upon the elastic property of the various disks, the two end disks of said expansion member being free at their outer peripheries and presenting radially extending flat annular attaching flanges adapted to be clamped against lateral faces of two end pipe connecting members of the expansion joint; whereby the concentration of stress occurring in the zone between the elastic and rigid portions of the joints is transferred from the region of the inner circumference of the end disks, where it would be a maximum, to the region of the outer circumference of the end disks where it is a minimum.

6. An expansion joint comprising a pair of end pipe connecting members, movable toward and from each other and presenting on their inner lateral faces flat annular radially extending seats, an expansion member arranged between said pipe connecting members and composed of a series of hardened steel disks welded together at their inner and outer peripheries to form a unitary homogeneous structure depending in its expansion and contraction on the elastic property of the various disks, the two end disks of said expansion member being free at their outer peripheries and presenting radially extending flat annular attaching flanges adapted to fit tightly against the seats of the two end pipe connecting members, and means for detachably clamping the radial flanges of the expansion member to the seats of the respective pipe connecting members in a fluid tight manner; whereby the concentration of stress occurring in the zone between the elastic and rigid portions of the joints is transferred from the region of the inner circumference of the end disks, where it would be a maximum, to the region of the outer circumference of the end disks where it is a minimum.

7. An expansion joint comprising a pair of end pipe connecting members, movable toward and from each other and presenting on their inner lateral faces flat annular radially extending seats, an expansion member arranged between said pipe connecting members and composed of a series of hardened steel disks welded together at their inner and outer peripheries to form a unitary homogeneous structure depending in its expansion and contraction on the elastic property of the various disks, the two end disks of said expansion member being free at their outer peripheres and presenting radially extending flat annular attaching flanges adapted to fit tightly against the seats of the two end pipe connecting members, and means for detachably clamping the radial flanges of the expansion member to the seats of the respective pipe connecting members in a fluid tight manner, and means for limiting the to and fro movements of the end pipe connecting members; whereby the concentration of stress occurring in the zone between the elastic and rigid portions of the joint near its outer periphery is prevented from exceeding the elastic limit of the metal comprising said member.

8. An expansion joint comprising a pair of end pipe connecting members, movable relatively toward and from each other and presenting on their inner lateral faces flat annular radially extending seats, a pipe section fastened rigidly to one of the end members and slidably arranged within the other, an expansion member arranged between said pipe connecting members and composed of a series of hardened steel disks welded together at their inner and outer peripheries to form a unitary homogeneous structure depending in its expansion and contraction on the elastic property of the various disks, the two end disks of said expansion member being free at their outer peripheries and presenting radially extending flat annular attaching flanges adapted to fit tightly against the seats of the two end pipe connecting members, and means for detachably clamping the radial flanges of the expansion member to the seats of the respective pipe connecting members in a fluid tight manner.

9. An expansion member for expansion joints, said member being composed of two series of elastic corrugated disks alternately welded at their inner and outer peripheries with the concave faces of the disks of one series contacting with the convex faces of the disks of the other series at their inner peripheries, and the convex faces of the disks of the first mentioned series contacting with the concave faces of the disks of the second mentioned series at their outer peripheries; whereby the alternate disks are positioned in compact relation with their contacting faces extending radially for a considerable distance, so that the disks may be melted together for a radial distance at least as great as the extent of their contacting faces.

10. An expansion member for expansion joints, said member being composed of corrugated metal disks alternately welded together at their inner and outer peripheries, the radii of curvature of the corresponding corrugations falling on the same side of all the disks but the magnitudes of the different radii of curvature being so proportioned that the alternate disks may be positioned in compact relation with suitable contacting surfaces for welding and with sufficient clearance between the remaining surfaces of the disks to permit the desired compressive movement.

11. An expansion member for expansion joints, said member being composed of a series of metal disks welded together at their inner and outer peripheries and having curved surfaces of contact at said inner and outer peripheries, the centers of curvature of any pair of contacting surfaces being located on the same side of the surfaces whereby, upon welding, the metal of the two adjoining disks will fuse together along said surface of contact for a distance not less than the thickness of the metal of the disks.

12. An expansion member for expansion joints, said member being composed of a series of metal disks welded together at their inner and outer peripheries and having surfaces of contact extending from the edges of the disks not less than the thickness of the metal, the surfaces of the discs beyond the contacting surfaces being curved and the radii of curvature being on the same sides of the disks, but of different magnitudes; whereby the alternate disks may be positioned in compact relation and the metal of the disks melted in welding for a radial distance at least as great as the extent of their contacting faces.

In testimony whereof, I have affixed my signature hereto.

FREDERICK RAY.